3,215,526
COLUMBIUM CONTAINING COMPOSITION
Loyal A. Stoyell and Louis R. Matricardi, Tonawanda, N.Y., assignors to Union Carbide Corporation, a corporation of New York
No Drawing. Filed Nov. 2, 1962, Ser. No. 235,111
3 Claims. (Cl. 75—174)

This invention relates to a novel columbium containing composition and to a process for prodduction of said composition.

Columbium is often alloyed with medium carbon steel to provide a product having certain desirable properties. In the production of such columbium bearing alloys it is advantageous to add the columbium in such a manner that it dissolves rapidly in the molten steel. In the past columbium has generally been added in the form of a ferro-columbium alloy. Disadvantageously, however, the ferro-columbium tends to sink to the bottom of the molten metal bath and may result in an alloy of non-uniform composition.

It is an object of this invention to provide a columbium containing composition which has a density close to that of molten steel and which is highly soluble in molten steel. It is another object to provide a columbium composition which is useful as an agent for the addition of columbium to molten steel. It is a further object to provide a columbium containing composition useful as a raw material in the preparation of columbium and tantalum chlorides.

A composition which satisfies the requirements for a superior columbium addition agent comprises from about 33 to about 70 weight percent columbium, at least 80 weight percent of which is in the form of columbium carbide; from about 0.1 to about 40 weight percent tantalum; from about 0.5 to about 10 weight percent oxygen; from about 4 to about 18 weight percent iron; from about 3 to about 13 weight percent combined carbon; and up to 5 weight percent silicon, the balance being incidental impurities. The total carbon content is to be at least the stoichiometric equivalent of the oxygen content of the reducible oxides in the raw columbium ore.

A preferred composition is one in which the iron content is from about 8 to about 15 weight percent, and the oxygen content is less than about 3 weight percent.

It has been found that ratios of columbium plus tantalum to combined carbon of between about 3:1 and 13:1 are most desirable for the purpose of this invention. However, in some cases a product containing only partially reduced columbium and tantalum oxides is satisfactory, and in such cases the ratio of columbium and tantalum to combined carbon in the final product will be substantially higher. It is important that the oxygen content of the product should not exceed 10 percent, particularly when the composition is to be used in the manufacture of columbium and tantalum chlorides. The composition has proved to be particularly useful as a raw material in the above chlorination processes. The content of uncombined carbon may equal that of the combined carbon.

The properties of the composition are influenced by the amount of iron present. Inasmuch as the melting point of the composition increases sharply with increasing concentration of carbon and tantalum it can be appreciated that the time required to dissolve the columbium addition agent in the molten steel will also be increased. However, the presence of iron in the composition serves to materially decrease the melting point thus shortening the time required to dissolve the columbium composition in a bath of molten steel.

The tantalum content is important when considered in relation to the density of the composition. Since it is desirable to provide a columbium composition which has a density close to that of molten iron or steel the tantalum content must be controlled in order to avoid high densities which would cause the columbium composition to settle rapidly to the bottom of the molten metal bath.

The columbium addition agent herein described is prepared by reacting any suitable grade of columbium bearing ore with a suitable carbonaceous reducing agent, preferably with an excess of said reducing agent, in an electric arc furnace. The high temperature of the submerged arc provides for the reduction of substantially all the oxides present in the ore.

The composition may be characterized as having a density between about 7 and about 8.5 grams per cubic centimeter, inclusive and a dense metallic appearance.

A wide variety of columbium containing ores or mixture of ores are suitable as raw materials for the herein described columbium composition addition agent. Broad limits of the columbium-to-tantalum ratio are permissible within the scope of this invention. In general the ratio of columbium-to-tantalum may range from about 1 to 1 and lower to 100 to 1 and higher.

Typical ore compositions useful in the practice of the present invention are:

(a) Nigerian columbite containing about 67 percent $Cb_2O_5$, 6.5 percent $Ta_2O_5$, 18 percent FeO plus other oxides and incidental impurities.

(b) Common columbite containing about 61 percent $Cb_2O_5$, 8 percent $Ta_2O_5$, 18 percent FeO plus other oxides and incidental impurities.

(c) Nigerian tin slag containing less than 20 percent $Cb_2O_5$, less than 7 percent $Ta_2O_5$, as well as oxides of iron, tin, silicon, calcium, etc.

(d) Congo columbo-tantalite containing about 40 percent $Cb_2O_5$, about 40 percent $Ta_2O_5$, about 10 percent FeO; about 8 percent MnO plus other oxides and incidental impurities.

(e) Brazilian columbite containing about 58 percent $Cb_2O_5$, and about 0.1% $Ta_2O_5$.

(f) Technically pure columbium oxide, 98+% $Cb_2O_5$.

The following examples further illustrate the practice of the present invention.

*Example I*

A mixture of Nigerian columbite (56 percent $Cb_2O_5$, 12 percent $Ta_2O_5$, 15 percent FeO) and Belgian Congo columbo-tantalite (35 percent $Cb_2O_5$, 37 percent $Ta_2O_5$, 8 percent FeO), and 115 percent of the carbon stoichiometrically required for reduction of the metallic oxides present in the ore (supplied in the form of a mixture of charcoal, petroleum coke, and wood chips) were reacted in a shell furnace equipped with a single carbon electrode; the hearth was allowed to build up until the crucible was full; after allowing the furnace to cool sufficiently so that it could be safely handled the contents were removed and ground to a particle size suitable for future use as a steel additive. Chemical analysis indicated that the product contained 52 weight percent columbium, 18 weight percent tantalum, 10 weight percent iron, 5.2 weight percent oxygen, and 5.5 weight percent carbon, the remainder being incidental impurities.

Example II

A mixture of Nigerian and Belgian Congo columbite ore were reacted as described in Example I.

The analyses of the ores were:

|  | Nigerian Ore | Belgian Congo Ore |
|---|---|---|
| $Cb_2O_5$ | 56.2 | 34.5 |
| $Ta_2O_5$ | 12.6 | 37.7 |
| $TiO_2$ | 3.7 | 9.5 |
| FeO | 15.7 | 7.6 |
| $ZiO_2$ | 0.27 | 0.27 |
| Ratio, Cb:Ta | 3.8:1 | 0.78:1 |

The charge placed in the furnace contained 409 pounds of Nigerian ore, 91 pounds of Belgian Congo ore and carbon in the form of wood chips, petroleum coke and charcoal to 127 percent of the amount stoichiometrically required to reduce the oxides. By chemical analysis the product contained 51.4 weight percent columbium, 17.7 weight percent tantalum, 12.6 weight percent iron, 7.06 weight percent carbon, 3.0 weight percent oxygen, the remainder incidental impurities.

Example III

A mixture of the same materials described in Example II except that the charge of raw material contained about 23 weight percent lean scrap from previous charges and contained carbon in amount 134 percent of the amount stoichiometrically required to reduce the oxides. By chemical analysis the product contained 50.1 weight percent columbium, 18.2 weight percent tantalum, 12.0 weight percent iron, 6.96 weight percent carbon, 2.8 weight percent oxygen and the balance incidental impurities.

Example IV

Columbium containing composition prepared by direct reduction of columbite ore in a submerged arc furnace and containing about 50 percent columbium, 17 percent tantalum, 11 percent iron; 9 percent carbon, the remainder being unreduced oxides and impurities was added to molten steel at 1600° C. in the amount of 0.61 weight percent. After approximately 16 seconds, the columbium composition disappeared from the bath surface. About 20 seconds later, a sample of the molten steel was taken for analysis, and a recovery of 80 percent of the columbium added was found in the steel. No change in the temperature of the molten steel was noticed as a result of the columbium addition, and no slag was formed.

Example V

One part of columbium containing composition as shown in Example III, was added to 100 parts of molten steel under conditions similar to the ones shown in Example II. Samples taken after 40 seconds indicated a recovery of 92 percent of the added columbium.

What is claimed is:

1. As a composition of matter, the product of the direct carbon reduction in an electric furnace, of an oxidic columbium ore, said product consisting essentially of (a) from about 0.1 to about 40 weight percent tantalum; (b) from about 0.5 to about 10 weight percent oxygen; (c) from about 4 to about 18 weight percent iron; (d) from about 3 to about 13 weight percent combined carbon, up to 13 weight percent uncombined carbon, with the total carbon content being at least the stoichiometric equivalent of the oxygen content of the reducible oxides in the columbium ore; (e) up to 5 weight percent silicon; and (f) the balance from about 33 to about 70 weight percent columbium, at least 80 weight percent of said columbium being in the form of columbium carbide.

2. The composition of claim 1 wherein the density is from about 7 to about 8.5 grams per cubic centimeter.

3. The composition of claim 1 wherein the iron content is from about 8 to about 15 weight percent and the oxygen content is less than about 3 weight percent.

References Cited by the Examiner
UNITED STATES PATENTS

| 2,140,800 | 12/38 | Loemans | 75—84 |
| 2,205,386 | 6/40 | Balke et al. | 75—174 |
| 2,937,939 | 5/60 | Wilhelm et al. | 75—84 |
| 3,048,484 | 8/62 | Downing et al. | 75—84 |

DAVID L. RECK, *Primary Examiner.*

UNITED STATES PATENT OFFICE
CERTIFICATE OF CORRECTION

Patent No. 3,215,526                        November 2, 1965

Loyal A. Stoyell et al.

It is hereby certified that error appears in the above numbered patent requiring correction and that the said Letters Patent should read as corrected below.

Column 3, in the table, third column, line 3 thereof, for "9.5" read -- 0.5 --.

Signed and sealed this 19th day of July 1966.

(SEAL)
Attest:

ERNEST W. SWIDER                        EDWARD J. BRENNER
Attesting Officer                           Commissioner of Patents